United States Patent [19]

Myers

[11] Patent Number: 4,931,486
[45] Date of Patent: Jun. 5, 1990

[54] POLY(ALKYLENE CARBONATE) POLYOLS AS ANTISTATIC ADDITIVES FOR POLYURETHANES

[75] Inventor: Michael O. Myers, Baton Rouge, La.

[73] Assignee: The Dow Chemical Company, Midland, Mich.

[21] Appl. No.: 279,469

[22] Filed: Dec. 2, 1988

[51] Int. Cl.$^5$ .............................................. C08G 18/14
[52] U.S. Cl. .................................. 521/159; 521/172; 528/66; 528/83
[58] Field of Search ................. 521/159, 172; 528/66, 528/83

[56] References Cited

U.S. PATENT DOCUMENTS

| 4,357,401 | 11/1982 | Andre et al. | 429/172 |
| 4,617,325 | 10/1986 | Knobel et al. | 521/105 |
| 4,618,630 | 10/1986 | Knobel et al. | 521/105 |
| 4,713,399 | 12/1987 | Webb et al. | 521/110 |

*Primary Examiner*—Maurice J. Welsh

[57] ABSTRACT

This invention relates to polyisocyanate-based polymers prepared by reacting a polyisocyanate with a polyol composition containing a polyester polyol and a poly(alkylene carbonate) polyol. The presence of the poly(alkylene carbonate) polyol improves the semi-conductive properties of the polymer without requiring the use of semi-conductive fillers or ionizable salts.

10 Claims, No Drawings

POLY(ALKYLENE CARBONATE) POLYOLS AS ANTISTATIC ADDITIVES FOR POLYURETHANES

This invention relates to a polymer prepared from a polyisocyanate, a poly(alkylene carbonate) polyol and a polyester polyol which has the ability to dissipate static electrical charge.

BACKGROUND OF THE INVENTION

The majority of organic polymers are poor semi-conductors of electricity and therefore have a tendency to accumulate static electrical charge. As such, they cannot be readily used in application areas which require semiconductive properties unless further modified.

Polyisocyanate-based polymers are useful in a wide variety of applications. Some of the applications are more sensitive than others to damage or discomfort caused by the accumulation of static electrical charges and their ultimate discharge. Areas where this may be critical include, for example, packaging of electronic components and medical applications where certain clean room operations require an essentially dust-free environment. Clothing and equipment prepared from or containing polyisocyanate-based polymers may susceptible to the accumulation of static electricity and therefore will attract or be a means of transporting dust into the clean room or dust-free areas.

It is known, for example, to incorporate conductive fillers such as fibers, powders and particles into a polymer to enhance its conductivity and thus reduce its potential to accumulate static electricity. However, loadings of such fillers are often in excess of 15 percent or more to obtain the good electrical semiconductivity or static discharge properties. Such high loadings are not beneficial to the polymer and its physical properties and may, for example, increase its brittleness.

In U.S. Pat. Nos. 4,617,325 and 4,618,630, a means of obtaining polyurethane polymers which can dissipate electrical charge is taught by the use of antistatic additives consisting of ionizable salt in combination with "an enhancer." The enhancer is a certain carboxylic acid ester or salt of a fatty acid or phosphate ester. The incorporation of ionizable salts into a urethane polymer can lead to undesirable properties such as corrosion where the polymer may be in contact with metal surfaces and processing problems in the preparation of the polymer.

It would, therefore, be desirable to provide a polyisocyanate-based polymer which contains no fillers or ionizable salts and yet shows excellent static electrical discharge properties.

SUMMARY OF THE INVENTION

This invention is such a polymer.

In one aspect, this invention is a polyurethane polymer which is the product of a reaction mixture comprising an organic polyisocyanate, a poly(alkylene carbonate) polyol and a polyester polyol wherein the poly(alkylene carbonate) polyol is a polymer of an oxirane and carbon dioxide or a cyclic alkylene carbonate, having a carbon dioxide content of from about 2 to about 35 percent by weight and wherein the ratio of poly(alkylene carbonate) polyol to polyester polyol is from about 1:100 to about 1:1, and said reaction being conducted in the substantial absence of a semi-conductive filler and an ionizable salt.

Surprisingly, it has been discovered that incorporating poly(alkylene carbonate) polyols into a polyurethane polymer confers excellent static discharge properties to the polymer in the substantial absence of modification by use of fillers or ionizable salts.

DETAILED DESCRIPTION OF THE INVENTION

As described in the Summary of the Invention, polyurethane polymers with antistatic or electrical discharge properties can be obtained by reacting a polyisocyanate with a poly(alkylene carbonate) polyol and a polyester polyol.

The poly(alkylene carbonate) polyols (hereinafter referred to as PAC polyols) are polymers of an oxirane and carbon dioxide or a cyclic alkylene carbonate. Such PAC polyols are represented by the formula

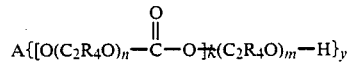

wherein each R is independently hydrogen, halogen or inertly-substituted alkyl or phenyl, A represents the residue from a polyhydric initiator, y is a number from about 2 to 8, m and n are numbers such that the PAC contains about 2 to about 35 percent by weight carbon dioxide, and k is a number such that the PAC polyol has an equivalent weight of about 100 to about 3000. Preferably, each R is hydrogen or lower alkyl, more preferably hydrogen or methyl, or most preferably hydrogen. The PAC polyol also preferably has an equivalent weight of about 500 to about 2000, more preferably about 800 to about 1500. Preferred PAC polyols contain about 5 to about 25, more preferably about 10 to about 20 percent carbon dioxide by weight of the PAC polyol. The value of y, average functionality, is preferably about 2 to about 4, more preferably about 2 to about 3.

The PAC polyol can be prepared by reacting an oxirane with either carbon dioxide or a cyclic alkylene carbonate, or a mixture thereof in the presence of a suitable initiator. Oxiranes useful herein contain an epoxy group and are otherwise inertly-substituted, i.e., contain no groups of substitution which undesirably interfere with the preparation of a PAC polyol therefrom or the preparation of a polyurethane polymer from the PAC polyol. Suitable oxiranes include ethylene oxide, propylene oxide, butylene oxide, styrene oxide, and the like. Most preferred is ethylene oxide due to its relatively facile reaction with carbon dioxide and/or a cyclic alkylene carbonate.

The PAC polyol is advantageously prepared by reacting the oxirane with carbon dioxide and/or cyclic alkylene carbonate in the presence of an initiator and an alkali metal or stannate catalyst under conditions of elevated temperature and pressure. Suitable processes for preparing PAC polyols are described, for example, in U.S. Pat. Nos. 3,248,414; 3,248,415; 3,248,416; 3,689,462; 4,330,481; and 4,686,276 (incorporated herein by reference).

The polyester polyols which can be employed in this invention are those having average hydroxyl functionality of about 2 to about 8, preferably from about 2 to about 4 and most preferably from about 2 to about 3. The polyester polyols have an average hydroxyl equivalent weight of from about 500 to about 5000, preferably from about 1000 to about 3000 and most preferably from about 1500 to about 2500.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic, and may be substituted (e.g., with halogen atoms) and/or unsaturated. Examples of carboxylic acids of this kind include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid, maleic acid, maleic acid anhydride, fumaric acid, dimeric and trimeric fatty acids such as oleic acid, which may be in admixture with monomeric fatty acids, terephthalic acid dimethyl ester, terephthalic acid bisglycol ester and the like. Mixtures of such acids or anhydrides may also be employed.

Examples of suitable polyhydric alcohols include ethylene glycol, 1,2-propylene glycol, 1,3-propylene glycol, 1,4-, 1,2- and 2,3-butylene glycol, 1,6-hexanediol, neopentyl glycol, cyclohexane dimethanol-(1,4-bis-hydroxy methyl cyclohexane)-2-methyl-1,3-propane diol, glycerol, trimethylolpropane, 1,2,6-hexanetriol, 1,2,4-butanetriol, pentaerythritol, quinitol, mannitol, sorbitol, methyl glucoside, diethylene glycol, triethylene glycol, tetraethylene glycol, polyethylene glycol, dipropylene glycol, polypropylene glycols, dibutylene glycol, polybutylene glycols and the like. It is also possible to use polyesters of lactones such as caprolactone or hydroxy carboxylic acids such as hydroxy caproic acid. Suitable processes for preparing polyester polyols are described, for example, in U.S. Pat. Nos. 3,773,822; 4,438,225; GB 1,474,541; and EP 143,304 (incorporated herein by reference).

The polyisocyanates useful in the present invention are organic polyisocyanates containing at least 2 isocyanate groups per molecule, preferably from 2 to about 10, more preferably from about 2 to about 3.5, and most preferably from about 2 to about 2.4 isocyanate groups per molecule. The suitable isocyanates include, for example, aromatic, aliphatic, cycloaliphatic, and heterocyclic polyisocyanates and combinations thereof.

Representative of these types are the diisocyanates such as p-phenylene diisocyanate, toluene-2,4-diisocyanate, toluene-2,6-diisocyanate, 2,4-, 2,6- and 1,6-hexamethylene diisocyanate, tetramethylene-1,4-diisocyanate, cyclohexane-1,4-diisocyanate, hexahydrotoluene diisocyanate, naphthylene-1,5-diisocyanate, xylene diisocyanate, 2,4'- and/or 4,4'-diphenylmethane diisocyanate, p-phenyl diisocyanate; the triisocyanates such as 4,4',4''-triphenylmethane triisocyanate; the polymethylene polyphenyl polyisocyanates; and such polyisocyanates as are described, for example, in U.S. Pat. Nos. 3,001,973; 3,124,605; 3,152,162; 3,394,164; 3,401,810; 3,454,006; 3,492,330; and 4,065,410, all of which are incorporated herein by reference. The aromatic polyisocyanates are generally preferred on the basis of cost and availability. The aromatic diisocyanates, especially mixtures of the 2,4- and 2,6-toluene diisocyanate isomers, 2,4'-diphenylmethane diisocyanate, 4,4'-diphenylmethane diisocyanate, p-phenylene diisocyanate, polymethylene polyphenyl polyisocyanates, and mixtures thereof and the like, are particularly preferred.

Isocyanate-terminated prepolymers and quasi-prepolymers can also be used as the polyisocyanate herein. Such prepolymers may be prepared with the same polyester and/or poly(alkylene carbonate) polyol used to prepare the polymer of this invention.

To prepare the polyurethane polymers of the present invention, the polyisocyanate is reacted with the poly(alkylene carbonate) polyol and polyester polyol. The quantity of polyisocyanate used is that generally sufficient to react with the hydroxyl groups of the poly(alkylene carbonate) polyol, polyester polyol, and any other active hydrogens which may be present as a result of the reaction mixture containing, for example, additional polyols, chain-extenders, water, and the like. The quantity of polyisocyanate used is advantageously such so as to provide from about 0.8 to about 3.0, preferably from about 0.8 to about 1.5, and more preferably from about 0.9 to about 1.25 isocyanate groups for each hydroxyl or active hydrogen contained in the reaction mixture.

The polyol component of the reaction mixture comprises the poly(alkylene carbonate) polyol, the polyester polyol, and optionally, additional polyols, chain-extenders and the like. The quantity of poly(alkylene carbonate) polyol used is sufficient to provide the polyurethane polymer with the ability to dissipate static electrical charge. Advantageously, the ratio of poly(alkylene carbonate) polyol to the polyester polyol is from about 1:100 to about 1:1, preferably from about 1:10 to about 1:1 and more preferably from about 1:5 to about 1:1. Poly(alkylene carbonate) polyol contents of the reaction mixture lower than this do not allow for the preparation of polymers displaying antistatic properties, and higher than these limits offer no advantageous gain in antistatic properties.

The optionally additional polyols, chain-extenders and the like are, in particular, low equivalent weight polyols, polyamines or alkanolamines often useful in preparing polyurethane polymers. The low equivalent weight materials provide for a more rapid curing in the initial stages of the polymer reaction. They are typically present in an amount from about 0 to about 15, preferably from about 1 to about 10, and more preferably from about 0 to about 5 percent by weight of the combined weight of poly(alkylene carbonate) polyol and polyester polyol present. Particularly suitable low equivalent weight materials include ethylene glycol, propylene glycol, butylene glycol, ethanolamine, diethanolamine, triethanolamine and the like.

In addition, catalysts are advantageously used to promote the reaction between the polyisocyanates and the poly(alkylene carbonate) polyols and polyester polyols. Suitable catalysts include the well-known organometallic and tertiary amine catalysts. Suitable catalysts are described, for example, in U.S. Pat. Nos. 2,846,408 and 4,495,081 (incorporated herein by reference). Suitable catalysts include, for example, tertiary amines such as triethylenediamine, N-methylmorpholine, N-ethylmorpholine, diethylethanolamine, N-cocomorpholine, 1-methyl-4-dimethylaminoethylpiperazine, 3-methoxy-N-dimethylpropylamine, N,N-dimethyl-N',N'-methylisopropylpropylenediamine, N,N-diethyl-3-diethylaminopropylamine, dimethylbenzylamine and the like. Suitable organometallic catalysts are, for example, tin compounds such as stannous chloride, tin salts of carboxylic acids such as dibutyltin di-2-ethylhexoate and the like. The quantity of catalyst used is sufficient to promote the reaction between the polyisocyanate and the polyols. The catalysts are typically used in a concentration from about 0.01 to about 1.0 weight percent of the total weight of poly(alkylene carbonate) polyols, polyester polyols and any optional polyols or chain-extenders comprising the reaction mixture.

Other optional components which may be added to the reaction mixture comprising the polyisocyanate, poly(alkylene carbonate) polyols and polyester polyols include conventional additives such as pigments, dyes, mold release agents, antioxidants. As stated before, a semi-conductive filler and an ionizable salt are substantially absent from the reaction mixture.

However, these materials may be used in small amounts. Ionizable salts if used may be present in amounts of about 0.5 part, preferably about 0.1 part or less per 100 parts of polyol composition. Semi-conductive fillers may be present in about 10 percent or less, preferably about 5 percent or less and more preferably about 1.0 percent or less by weight of total polymer weight. Most preferably essentially none of these materials are present.

In addition, should it be desired that the polymer have a cellular structure, other optional components advantageously used include a blowing agent and a surfactant for stabilizing the foaming reaction mixture until it cures. Suitable blowing agents include water, and low boiling halogenated hydrocarbons such as dichlorodifluoromethane, trifluorochloromethane, methylene chloride, and inert gases, and the like. Sufficient quantity of blowing agent is used to provide a polymer with a cellular structure and the desired density. Larger quantities of blowing agent provide a lower density polymer. Most preferably, a blowing agent is not present in the reaction mixture.

The surfactant, when used, is typically a silicone surfactant compatible with the poly(alkylene carbonate) polyols and polyester polyols. Suitable silicone surfactants for use in preparing foams are described in U.S. Pat. Nos. 3,796,672; 3,833,512; and 4,031,042 (incorporated herein by reference).

In preparing the polyurethane polymers of this invention, the reaction mixture comprising the poly(alkylene carbonate) polyols and polyester polyols is advantageously blended with the polyisocyanate, adjusted to a temperature of about ambient to about 160° C., and maintained at such temperature until curing is complete. Processes suitable for the preparation of polyurethane polymer are described, for example, in U.S. Pat. Nos. 3,639,543; 4,218,543; 4,451,588; 4,495,081; and 4,552,945, all of which are incorporated herein by reference.

The polyurethane polymer described by this invention is substantially more conductive than a like polymer which does not contain the poly(alkylene carbonate) polyol, or one which contains only polyester polyol. Therefore, their ability to dissipate static electrical charge is much greater. The polyurethane polymers described by the invention are capable of dissipating 99 percent of an applied static charge in a relatively short time, i.e., less than about 12 seconds, more preferably less than about 5 seconds, most preferably less than about 2 seconds.

The polyurethane polymers described by this invention are useful as films, coatings, adhesives, shoe soles, elastomeric sealings and molded products, particularly for use in application where antistatic or electrical discharge properties are of value.

Illustrative Embodiments

The following examples are provided to illustrate the invention and not to limit the scope thereof. All parts and percentages are by weight unless otherwise indicated.

Polyurethane cast elastomers Samples 1 and 2 and Comparative Samples A to D are prepared from the components as indicated in Table I. Elastomer plaques of dimensions $6'' \times 16'' \times \frac{1}{8}''$ are prepared. Static decay times and surface resistivities of the polymers are also indicated in Table I.

The ability of these polymers to dissipate a static charge is measured on an Electrotech 406C Static Decay Meter. After conditioning, the sample is charged to ±5000 V and the time, in seconds, observed for the charge to decay to ±50 V when the sample is grounded; relative humidity is 15 percent.

The static decay data is presented in three sets. Static decay data set A—The sample is conditioned for 24 hours in a dry box at ambient temperature prior to testing. Static decay data set B—The conditioned sample from A is stored for 7 days at ambient temperature and relative humidity of 50 percent, and then for 24 hours in a dry box prior to testing. Static decay data set C—The conditioned sample from B is stored in a dry box for one month prior to testing. Surface resistivity of the sample is measured with a 616 digital electrometer.

TABLE I

|  | A* | 1 | 2 | B* | C* | D* |
|---|---|---|---|---|---|---|
| Polyester Polyol A [1] | 180.3 parts | 126 parts | 126 parts | — | — | — |
| PAC Polyol A [2] | — | 54 parts | 54 parts | 88 | — | — |
| PAC Polyol B [3] | — | — | — | — | — | — |
| PAC Polyol C [4] | — | — | — | — | 88 | — |
| PAC Polyol D [5] | — | — | — | — | — | 88 |
| 1,4-Butanediol | 21.6 parts | 21.6 parts | 21.6 parts | 12 | 12 | 12 |
| Catalyst [6] | 0.2 parts | 0.2 parts | — | 0.2 | — | — |
| Isocyanate [7] | 94.6 parts | 94.5 parts | 93.5 parts | 51.4 | 53.4 | 54.0 |
| Reaction Temp | 70° C. | 70° C. | 70° C. | 70 | 70 | 70 |
| Gel Time | 15 min | 14 min | 12 min | N/O** | N/O** | N/O** |
| Cure Temp | 125° C. | 125° C. | 125° C. | 125 | 125 | 125 |
| Cure Time | 3 hours | 3 hours | 3 hours | 3 | 3 | 3 |
| Static Decay | + − | +°− | + − | + − | + − | + − |
| (time) A | 18.99 13.33 | 2.67 2.49 | 2.36 2.22 | 3.72 3.30 | 0.97 0.95 | 0.18 0.18 |
| (sec) B | 22.23 19.34 | 3.51 3.76 | 2.52 2.81 | 4.89 5.27 | 1.28 1.43 | 0.28 0.32 |
| C | 22.94 22.37 | 6.00 5.73 | 3.89 4.76 | 17.74 18.47 | 2.92 3.63 | 0.58 0.72 |
| Surface Resistivity | $8.13 \times 10^{11}$ | $5.65 \times 10^{11}$ | $4.0 \times 10^{11}$ | $4.4 \times 10^{11}$ | $2.9 \times 10^{11}$ | $4.7 \times 10^{11}$ |

TABLE I-continued

| | A* | 1 | 2 | B* | C* | D* |
|---|---|---|---|---|---|---|
| (ohm/sq) | | | | | | |

*Not an example of the invention
**N/O - not observed
[1] Polyester Polyol A is Formez 53, a trimethylolpropane-extended glycol adipate polyester polyol sold by Witco Chemical Company
[2] PAC Polyol A is a poly(ethylene carbonate) diol containing 30 percent $CO_2$ and having an equivalent weight of 1038
[3] PAC Polyol B is a poly(ethylene carbonate) diol containing 23.5 percent $CO_2$ and having an equivalent weight of 1040
[4] PAC Polyol C is a poly(ethylene carbonate) diol containing 15 percent $CO_2$ and having an equivalent weight of 895
[5] PAC Polyol D is a poly(ethylene carbonate) diol containing 10.6 percent $CO_2$ and having an equivalent weight of 861
[6] Catalyst is Cocure 44 or mercury-based urethane catalyst sold by Cosan Chemical Company
[7] Isocyanate is a MDI prepolymer having an equivalent weight of 181 and average functionality of 2.3

The short static decay time of Samples 1 and 2 in Table I clearly show the advantage to be obtained in preparing polyurethane polymers with a mixture of polyester and poly(alkylene carbonate) polyols in comparison to the Comparative Sample A or Comparative Sample B.

Comparative Samples C and D show the variation in static decay properties of the polymer with carbon dioxide content of the PAC polyol. Lower carbon dioxide contents give improved static decay properties, thus it is of advantage to consider the use of such low carbon dioxide content PAC polyols when preparing polymers of this invention.

What is claimed is:

1. A polyurethane polymer which is the product of a reaction mixture comprising an organic polyisocyanate, a poly(alkylene carbonate) polyol and a polyester polyol, wherein the poly(alkylene carbonate) polyol is a polymer of an oxirane and carbon dioxide or a cyclic alkylene carbonate, having a carbon dioxide content of about 2 to about 35 percent by weight and wherein the ratio of poly(alkylene carbonate) polyol to polyester polyol in the reaction mixture is from about 1:100 to about 1:1, and said reaction being conducted in the substantial absence of a semi-conductive filler and an ionizable salt.

2. The polymer of claim 1 wherein the organic polyisocyanate is toluene diisocyanate, diphenyl methane diisocyanate, polymethylene polyphenyl isocyanate or mixtures, derivatives or prepolymers thereof.

3. The polymer of claim 2 wherein the organic polyisocyanate is used in an amount so as to provide from about 0.8 to 1.5 isocyanate groups of active hydrogen of the reaction mixture.

4. The polymer of claim 3 wherein the poly(alkylene carbonate) polyol contains from about 5 to about 25 weight percent carbon dioxide and has an equivalent weight of from about 100 to 3000.

5. The polymer of claim 4 wherein the poly(alkylene carbonate) polyol has an average functionality from about 2 to about 4 and an equivalent weight from about 500 to about 2000.

6. The polymer of claim 5 wherein the poly(alkylene carbonate) polyol is a reaction product of ethylene oxide, and carbon dioxide ethylene carbonate or mixtures thereof.

7. The polymer of claim 6 wherein the ratio of poly(alkylene carbonate) polyol to polyester polyol is from about 1:10 to about 1:1.

8. The polymer of claim 7 wherein the ratio is from about 1:5 to about 1:1.

9. The polymer of claim 1 which dissipates an electrostatic charge of about 5000 volts to an electrostatic charge of about 50 volts in a period of time which is about 12 seconds or less.

10. The polymer of claim 9 wherein the electrostatic charge is dissipated in a period of time from about 5 seconds or less.

* * * * *